United States Patent
Davidson et al.

[15] 3,705,735
[45] Dec. 12, 1972

[54] ELECTRICALLY INSULATING JOINTS FOR HIGH-PRESSURE PIPELINES

[72] Inventors: David Fulton Davidson, Hale Barns; Brian Arthur Irving, Sale, both of England

[73] Assignee: Associated Electrical Industries Limited, London, England

[22] Filed: Feb. 20, 1970

[21] Appl. No.: 13,143

[52] U.S. Cl. ...................................285/53, 285/55
[51] Int. Cl. ..........................F16l 19/02, F16l 58/00
[58] Field of Search..........285/53, 52, 50, 48, 47, 54, 285/55; 204/196, 290

[56] References Cited

UNITED STATES PATENTS 3,081,252  3/1963  Preiser et al.......................204/290 X
3,133,873  5/1964  Miller et al..........................204/196

FOREIGN PATENTS OR APPLICATIONS 1,150,047  4/1969  Great Britain..........................285/53
  567,159  1/1945  Great Britain..........................285/52

Primary Examiner—Thomas F. Callaghan
Attorney—Larson, Taylor & Hinds

[57] ABSTRACT

An electrically insulating joint between two electrically conducting pipe which in use are at different electrical potentials, wherein the pipes are clamped to opposite ends of an insulating spacer sleeve with metal collars interposed between the ends of the sleeve and the pipes, and at least the one of the collars which is anodic with respect to the other being formed of a metal such as titanium which forms a protective insulating skin under electrolytic action and thereby reduces the rate of galvanic corrosion.

7 Claims, 1 Drawing Figure

PATENTED DEC 12 1972    3,705,735
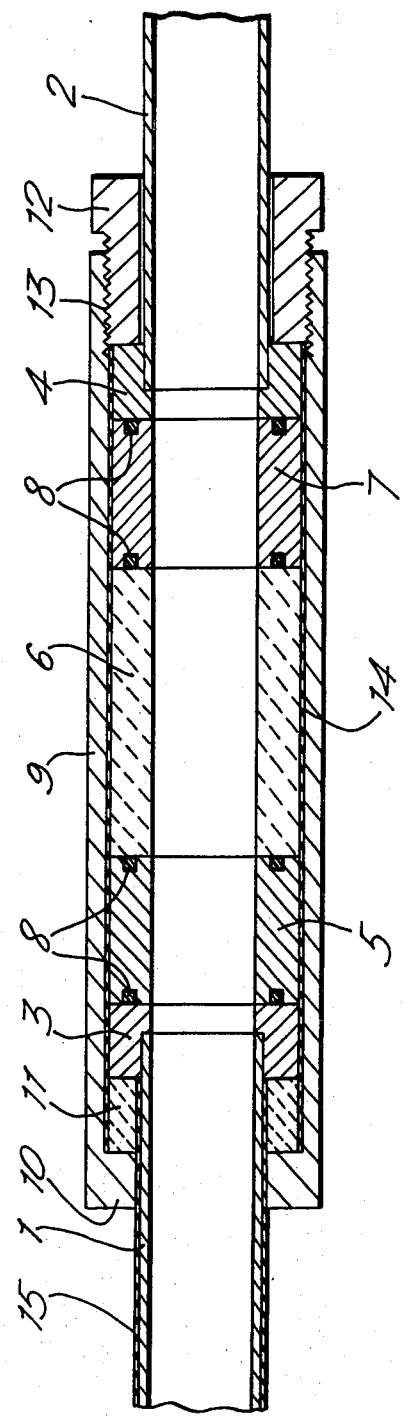

ELECTRICALLY INSULATING JOINTS FOR HIGH-PRESSURE PIPELINES

This invention relates to electrically insulating joints for high-pressure pipelines.

It is known for the windings of an electrical machine, for example the field windings on the rotor of a turbo-generator, to be directly cooled by circulating a cooling liquid through the windings, which are in the form of electrically conducting pipes. It may be necessary to connect together two such pipes which in operation of the machine are at different electrical potentials, for example to connect a cooling liquid manifold which is at earth potential to the turns of the winding which are at different potentials, and for this purpose it is necessary for the joint between the two pipes to be electrically insulating. In addition, when the joint is in a moving part of the machine it is necessary for it to be able to withstand the pressures developed in the cooling liquid by centrifugal force, which may be very high, as well as any mechanical vibration present. The joint must also be able to withstand the temperatures at which the machine operates.

One such electrically insulating joint is described in British Pat. Specification No. 1,150,047, and comprises a substantially rigid, electrically insulating, pressure resistant spacer sleeve interposed between end portions of increased external diameter of the two pipes, and a clamping sleeve electrically insulated from at least one of said pipes and having at one end a portion of reduced internal diameter and at the other end a clamping nut, by means of which clamping sleeve the said end portions are pressed in liquid-tight manner against the end faces of the spacer sleeve. Sealing rings may be provided in recesses between the end portions and the spacer sleeves.

If the conductive pipes are at a different electrical potential, as may be the case in operation of the machine, the conductivity of the cooling liquid may be such that electrolytic action will take place in the cooling liquid between the two conducting pipes. Although demineralized water may be used as cooling liquid, since this has a low electrical conductivity, there may still be a small leakage current between the pipes, and this may eventually cause galvanic corrosion at that pipe which is anodic with respect to the other. This corrosion may eventually lead to failure of one of the liquid-tight seals.

One object of the present invention is to provide protection against such corrosion.

According to the invention, an electrically insulating joint between two electrically conducting pipes for conducting a liquid at high pressure which in use are at different electrical potentials, comprises a rigid, pressure-resistant and electrically insulating spacer sleeve the end faces of which are respectively in liquid-tight relationship with a pair of metal collars which in turn are respectively in liquid-tight relationship with the end of the two pipes, at least the one of said collars which is anodic with respect to the other in use of the arrangement being in contact with the liquid and being of a metal which forms under electrolytic action a protective skin which is highly resistant to the flow of electric current, thereby reducing the rate of galvanic corrosion.

Said metal is preferably titanium, although other suitable metals are Tantalum, Niobium, Zirconium, Vanadium, Hafnium. It will be understood that the term "metal" includes alloys of titanium with any of these alternative metals or alloys of any of these metals containing other elements to improve specific properties such as mechanical strength.

The pipes may be formed with end portions of enlarged external diameter and be surrounded by a clamping sleeve electrically insulated from at least one of the two pipes, the clamping sleeve having at one end a portion of reduced internal diameter and at the other end a clamping nut arranged to urge the two enlarged end portions of the pipes inwards towards the spacer sleeve.

In such an arrangement the said collars may be of greater external diameter than the pipes and be attached to the respective pipes, for example by welding or brazing, to form the said enlarged end portions, the collars being pressed in a liquid-tight manner against the respective end faces of the spacer sleeve by the clamping sleeve.

Alternatively the collars may be separate from the pipes and interposed between the ends of the spacer sleeve and the respective ends of the pipes, the clamping sleeve pressing the pipes against the collars and the collars against the spacer sleeve in a liquid-tight manner. This alternative arrangement has the advantage that the collars may be replaced if necessary without disturbing the pipework. In the alternative arrangement, the enlarged ends of the pipes may be formed by ferrules secured to the pipes and of the same material as the collars.

One electrically insulating joint in accordance with the invention will now be described, by way of example, with reference to the accompanying drawing, which is a diagrammatic cross-sectional view of the joint.

Referring to the figure, two pipes, 1 and 2, forming hydraulic connections to part of the field windings on the liquid-cooled rotor of a turbo-generator, have end portions 3, 4 of enlarged external diameter formed by titanium ferrules brazed on to the ends of the respective pipes. Between the two end portions 3 and 4 are held, in order, a titanium collar 5, a ceramic spacer sleeve 6, and another titanium collar 7, each being of the same cross-section as the end portions 3, 4. Each end face of each of the collars 5, 7 has an annular groove in which a sealing ring 8 is located. The ceramic sleeve 6 is conveniently a sintered oxide material, and the sealing rings 8 are conveniently "O" rings of an ageing-resistant plastics material.

The end portions 3, 4 the collars 5, 7 and the sleeve 6 are surrounded by and clamped together by a clamping sleeve 9 which has at one end a portion 10 of reduced internal diameter which bears via a ceramic bush 11 upon the portion 3 of enlarged external diameter of the first pipe 1, and at the other end a clamping nut 12 engaging with a threaded portion 13 of the sleeve 9 and bearing upon the portion 4. The sleeve 9 is lined over its length between the portion 10 and the nut 12 with the insulating layer 14 of heat-stabilized polyester film, and the first pipe 1 is covered with a layer of insulating material 15, shrunk on to the pipe.

The first pipe 1 is connected hydraulically and electrically to one of the turns of the field windings, and the second pipe 2 is part of a cooling liquid manifold supplying demineralized water to the field windings via the first pipe 1, and is at earth potential. Thus in operation of the turbo-generator the first pipe 1 is at a higher voltage than the second pipe 2 and the nut 12 and the sleeve 9 will be at the same voltage as the second pipe 2, being insulated from the first pipe 1 by means of the layers 14, 15 and the bush 11. The layers 14, 15 are long enough to prevent creepage current over their surfaces.

Thus the pipes 1, 2 are connected by an electrically insulating joint, and the surfaces which are most liable to electrolytic action are of titanium and are thereby protected by the insulating film which forms on the titanium. It will be understood that the leakage current varies approximately inversely with the distance between the pipes. Therefore, after the protective film has formed the resistance of the leakage path in the liquid is increased which reduces this current to a value which does not cause appreciable damage. The lifetime of the joints is thus increased considerably, but if necessary, the collars 5, 7 may readily be replaced without disturbing the pipes 1, 2. It will be appreciated that there the voltage is only applied in one direction, as in the arrangement described, only the anodic side need be protected in this way, although it may be more convenient to manufacture both sides in the same way.

Moreover if it is considered advisable additional protection can be obtained by making the pipes 1 and 2 entirely of titanium or making at least several inches of the pipe which is anodic of titanium.

We Claim:

1. An electrically insulating joint comprising two electrically conducting pipes for conveying a liquid at high pressure and which in use are at different electrical potentials, said pipes having end portions of enlarged external diameter, a rigid pressure-resistant and electrically-insulating spacer sleeve between the enlarged ends of the pipes, a pair of collars separate from the pipes each interposed between the end of a respective pipe and the adjacent end of the spacer sleeve, and a clamping sleeve surrounding the enlarged ends of the two pipes and electrically insulated from at least one of the pipes, said clamping sleeve including at one end a portion of reduced internal diameter, said joint further comprising a clamping nut at the other end of said clamping sleeve for urging the two enlarged end portions inwards to press the pipes against the collars and the collars against the spacer sleeve in a liquid-tight manner to form the joint, at least the one of said collars which is anodic with respect to the other in use of the arrangement being in contact with the liquid and being of a metal which forms under electrolytic action a protective skin which is highly resistant to the flow of electric current, thereby reducing the rate of galvanic corrosion.

2. An electrically insulating joint according to claim 1, wherein the enlarged ends of the pipes are formed by ferrules secured to the pipes.

3. An electrically insulating joint according to claim 2, wherein the ferrules are of the same material as the collars.

4. An electrically insulating joint according to claim 3, wherein both collars and both ferrules are of titanium.

5. An electrically insulating joint according to claim 1, wherein each end surface of each of the collars is formed with an annular groove containing a sealing ring which is clamped against the adjacent end surface of the spacer sleeve or end of a pipe as the case may be.

6. An electrically insulating joint according to claim 5, wherein the sealing rings are of plastics material.

7. An electrically insulating joint according to claim 1 for conveying high pressure liquid coolant between a manifold and a field winding of a turbo generator.

* * * * *